United States Patent

Miller

(10) Patent No.: US 6,521,273 B1
(45) Date of Patent: Feb. 18, 2003

(54) MALT-INFUSED COCOA AND CHOCOLATE FORMULATIONS

(76) Inventor: Van Miller, P.O. Box 100, Norval Ontario (CA), L0P 1A0

( * ) Notice: Subject to any disclaimer, the term of this patent is extended or adjusted under 35 U.S.C. 154(b) by 0 days.

(21) Appl. No.: 10/205,382

(22) Filed: Jul. 26, 2002

(51) Int. Cl.$^7$ .................................................. A23G 1/00
(52) U.S. Cl. ........................ 426/93; 426/466; 426/618
(58) Field of Search ................... 426/593, 466, 426/93, 452, 96, 618, 98, 619, 99, 620, 621

(56) References Cited

U.S. PATENT DOCUMENTS

| | | | | |
|---|---|---|---|---|
| 4,119,740 A | * | 10/1978 | Crespo | 426/631 |
| 4,282,319 A | * | 8/1981 | Conrad | 435/68.1 |
| 4,312,890 A | * | 1/1982 | Liggett | 426/466 |
| 4,335,153 A | * | 6/1982 | Rikon et al. | 426/540 |
| 4,377,602 A | * | 3/1983 | Conrad | 426/656 |
| 4,857,339 A | * | 8/1989 | Maselli et al. | 426/28 |
| 5,518,754 A | * | 5/1996 | Miller et al. | 426/611 |
| 5,552,175 A | * | 9/1996 | Camburn | 426/615 |
| H1620 H | * | 12/1996 | Dolan et al. | 426/593 |
| 5,695,795 A | * | 12/1997 | Murray et al. | 426/11 |
| 6,368,655 B1 | * | 4/2002 | Miller et al. | 426/631 |

FOREIGN PATENT DOCUMENTS

WO    WO 79/00421    * 12/1979

* cited by examiner

*Primary Examiner*—Carolyn Paden
(74) *Attorney, Agent, or Firm*—Marks & Clerk

(57) ABSTRACT

A malted-infused chocolate formulation comprises from 19% to 50% by weight of cocoa liquor and from 81% to 50% by weight of a non-fat, cereal based cocoa extender; or alternatively the formulation comprises from 11% to 29% by weight of cocoa butter, and from 89% to 71% by weight of non-fat, cereal-based cocoa extender. The non-fat, cereal based cocoa extender consists of finely ground toasted malted cereal chosen from the group consisting of barley, wheat, rye, buckwheat, rice and mixtures thereof. Methods of making the chocolate formulations include the steps of toasting the cereal to a desired color and flavor, grinding the toasted cereal, cooling, and adding the requisite amount of cocoa liquor or cocoa butter.

18 Claims, No Drawings

MALT-INFUSED COCOA AND CHOCOLATE FORMULATIONS

FIELD OF THE INVENTION

This invention relates to malt-infused cocoa and chocolate formulations. In effect, the present invention relates to chocolate formulations having cereal-based cocoa extenders, where the cocoa extenders are derived from toasted malted cereals.

BACKGROUND OF THE INVENTION

The present discussion assumes a working knowledge by the reader and practitioner of this invention of the basics of chocolate formulations in general, and of the manner in which cereals, such as barley, are malted.

Nonetheless, for purpose of understanding certain terminology used herein, a brief review of those technologies now follows.

It is well known that cocoa is the principle flavouring ingredient, and a principle fat ingredient, of chocolate. Eating chocolates, such as milk chocolate and the like, are compound formulations which employ additional sources of fat, milk solids, and the like, but cocoa is the principle flavour source.

Cocoa is derived from the cacao tree, which was originally native to South America, but which is now widely cultivated around the world in the equatorial regions. That is to say, cacao trees are grown in tropical and sub-tropical regions only. Cocoa is obtained by fermenting the fruit, which grows in pods that contain a sweet pulp with rows of embedded seeds. The fermented pods are treated to extract the seeds, which are then cured and roasted, to obtain clean kernels—which are referred to in the industry as cocoa nibs. Cocoa products generally have relatively high food values because of their fat, carbohydrate, and protein contents.

Cocoa beans comprise approximately 54% fat, and that fat content is taken into account in arriving at certain ranges of ingredients as discussed hereafter.

Chocolate liquor is obtained by grinding the roasted cocoa nibs, so as to form a thick smooth paste.

Very often, the cocoa liquor—also, variously referred to as chocolate liquor or chocolate liquid—is pressed using hydraulic presses. The paste is placed between press plates and high pressure is applied, with a yellowish-white vegetable fat being squeezed out. That fat is known as cocoa butter, and it carries a significant chocolate flavour. Most flavour constituents of the cocoa lodge themselves in the fat.

What remains in the hydraulic press after the cocoa butter has been removed is a pressed cake, which is known in the industry as cocoa powder.

However, various cocoa powders are known in the industry as having more or less fat content, depending on the amount of pressing—pressure and time—that has been applied to the cocoa liquor.

As noted, another principle ingredient in preparation of the malt-infused chocolate formulations in keeping with the present invention is finely ground toasted malted cereals.

Of course, malting is well known in the whisky and beer industries, and the term refers to the preparation of cereal grain—usually barley, but other cereals as noted hereafter may also be malted—for further processing in the distilling and brewing industries. The following discussion is particularly in respect of the preparation of malted barley, a principle ingredient in the preparation of beer.

First, the barley or other cereal is steeped. By that, it is meant that the barley is soaked in water, under specific and controlled conditions, the details of which are not relevant to the present invention.

Thereafter, the barley is germinated, during which enzyme production occurs in the kernels, and new growth of the kernels occurs.

Thereafter, what is by then known as the malt, is kilned. That is to say, the germination process in the malt is arrested, and the malt is dried and cured.

In the drying step, the malt is heated to a relatively low temperature over a fairly long period of time; in the curing stage the temperature is raised—typically, the curing temperature is below the boiling point of water—after which the malting process is concluded.

However, in keeping with the present invention, one further step occurs, and that is to toast the malted cereal. By toasting, it is meant that the malted cereal is exposed to a relatively high temperature for a relatively short period of time, whereby it changes its colour by darkening, carmelization of sugars in the cereal will occur, and most remaining moisture will be driven off.

It has been noted that cacao trees are grown only in tropical and sub-tropical regions. However, as a consequence of market forces, including increased demand for cocoa and chocolate products, the price of cocoa has increased considerably over the past decade or so. Accordingly, supply has fallen behind demand.

The situation has been somewhat exacerbated because a number of European countries now permit up to 5% vegetable oil—palm kernel oil, or the like—to chocolate. This has put forward pressure on the price of cocoa butter, and upward pressure on the price of the non-fat portion of the cocoa bean production, namely the cocoa powder.

Moreover, the price of cocoa powder is calculated from the sum of the total asking prices, particularly in the futures market, less the highest demand—which in this case, is for cocoa powder. Thus, the price of cocoa butter has slipped, relative to the price of cocoa powder.

That is, at least in part, because the use of cocoa powders in various food products such as desserts, cakes, biscuits, ice cream, snacks, chocolate milk, cocoa beverages, and so on, has increased, beyond the demand for compound chocolate where the contribution of cocoa butter is required—such as in eating chocolate as used in chocolate bars and chocolate-based confections, in enrobing chocolate, and the like.

The present invention is predicated on the fact that cocoa butter can be used for the fat source in the preparation of chocolate formulations. Either cocoa butter, or cocoa liquor, can be employed, it being recognized that the fat content of cocoa liquor is approximately 54% and that the fat content of cocoa butter is effectively 100%.

Thus, in order to provide a standard chocolate formulation having approximately 10% to 12% fat content, with 78% to 80% non-fat content, (or other standard chocolate formulations as described hereafter), and having in mind that a significant chocolate flavour contribution can be derived from the use of cocoa fat, and that further flavour contribution can be derived in respect of a toasted, carmelized, flavour contribution, the present invention unexpectedly recognizes therefore that toasted malted cereals can be employed to provide significant bulk and appropriate flavour contributions to chocolate formulations.

Thus, as will be noted hereafter, malt-infused chocolate formulations can be provided that will result in organoleptic characteristics, colour, handling characteristics, and the like, which are the same as commercial cocoa.

To arrive at the provision of the non-fat, cereal-based cocoa extenders in keeping with the present invention, the applicability and suitability of barley—specially two-row barley—as well as wheat, rye, buckwheat, oak, and rice, and mixtures thereof, is discussed hereafter.

DESCRIPTION OF THE PRIOR ART

Rikon et al U.S. Pat. No. 4,335,153, issued Jun. 15, 1982, teaches a formulation and process for the preparation of imitation cocoa powder. This patent specifically discusses the provision of a completely imitation product which is intended to replicate cocoa, and has particularly for its purpose to provide an imitation product which replaces natural cocoa powder without having to adjust or vary the formulation for products which would otherwise contain natural cocoa powder. Thus, the Rikon et al patent is specifically intended to provide an imitation cocoa replacement, as opposed to cocoa extenders, where the imitation cocoa provides essentially the same functional and organoleptic properties in the end use product to be manufactured from the imitation cocoa, as those which are obtainable with natural cocoa powders.

Thus, Rikon et al teaches a product which is not at all natural in the sense that it is not derived from cocoa beans, as is the present invention. Indeed, the patent teaches the preparation of imitation cocoa powders, chocolate liquors, and the like, including even the use of artificial chocolate flavour. Moreover, the patent specifically teaches the use of hydrogenated vegetable fats.

Liggett U.S. Pat. No. 4,312,890, issued Jan. 26, 1982, and a related PCT publication WO 79/0042 1, teach the provision of a cocoa substitute which is derived from roasted yeast. Once again, the teachings of the Liggett patents are particularly directed to the provision of cocoa substitutes by which particularly chocolate flavoured beverages can be prepared. An example which teaches the preparation of a substitute for enrobing chocolate, however, does teach the use of cocoa butter together with the roasted yeast, sugar, imitation vanilla, imitation cream, and a malt extract.

A cocoa extender is taught in Crispo U.S. Pat. No. 4,119,740, issued Oct. 10, 1978. Here, the cocoa extender is derived from peanut grit, almond shells, or soya bean flakes, which are then roasted so as to provide a rich chocolate brown colour without developing any taste or flavour characteristics which are inimical with chocolate flavour, or which provide any other undesired flavour or physical property.

The Crispo formulations are such that compound chocolates are provided that include cocoa and the cocoa extender, together with typical chocolate ingredients such as sugar, milk solids, vegetable fat, and the like.

SUMMARY OF THE INVENTION

As discussed above, a principle purpose of the present invention is to permit the use of cocoa liquor or cocoa butter as the fat source, and to replace the cocoa solid with another solid—in this case, a non-fat, cereal-based cocoa extender which comprises finely ground toasted malted cereal. The cereal may be chosen from the group which consists of barley, wheat, rye, buckwheat, rice, oats, and mixtures thereof.

To that end, the present invention provides a malt-infused chocolate formulation which comprises from 19% to 50% by weight of cocoa liquor and from 81% to 50% by weight of non-fat, cereal-based cocoa extender.

The non-fat, cereal-based cocoa extender consists of finely ground toasted malted cereal which is chosen from the group consisting of barley, wheat, rye, buckwheat, rice, and mixtures thereof.

So as to meet standard market expectations and conditions, the present invention provides malt-infused chocolate formulations wherein the ranges of the formulation are in keeping with conventional cocoa nomenclature as follows:

| | |
|---|---|
| Breakfast Cocoa | 40% to 46% cocoa liquor |
| | 60% to 54% non-fat cocoa extender |
| Medium Fat Cocoa | 26% to 34% cocoa liquor |
| | 74% to 66% non-fat cocoa extender |
| Low Fat Cocoa | 19% to 23% cocoa liquor |
| | 81% to 77% non-fat cocoa extender |

Typically, in keeping with the present invention, the finely ground non-fat, cereal-based cocoa extender has been ground to a fineness such that at least 99% thereof passes through a 200 mesh sieve.

Also, typically, the finely ground non-fat, cereal-based cocoa extender is based on malted barley.

If so, then typically the barley is a two-row barley.

So as to provide additional chocolate flavour, if necessary, the present invention provides that the malt-infused chocolate formulation may further comprise up to an additional 5% by weight of natural chocolate flavour additive.

In another principle embodiment of the present invention, the malt-infused chocolate formulation may comprise from 10% to 27% by weight of cocoa butter, and from 90% to 73% by weight of the non-fat, cereal-based cocoa extender.

In that case, the ranges of the formulations in keeping with conventional cocoa nomenclature, are as follows:

| | |
|---|---|
| Breakfast Cocoa | 22% to 24% cocoa butter |
| | 78% to 76% non-fat cocoa extender |
| Medium Fat Cocoa | 14% to 18% cocoa butter |
| | 86% to 82% non-fat cocoa extender |
| Low Fat Cocoa | 10% to 12% cocoa butter |
| | 90% to 88% non-fat cocoa extender. |

The present invention also provides methods for making malt-infused chocolate formulations in keeping with the present invention. The method comprise the following steps:

(a) Toasting the malted cereal to a desired degree of colour and flavour.

(b) Grinding the toasted cereal of step (a).

(c) Cooling the ground toasted cereal to below 30° C.

(d) Adding the desired amount of cocoa liquor, or cocoa butter—depending on the formulation and the principle ingredients being employed—to the ground toasted cereal, and thoroughly mixing the same.

As above, typically step (b) is carried out so that at least 99% of the ground toasted cereal will pass through a 200 mesh sieve.

Also, the present invention may comprise the following further step:

After step (c), adding an additional natural chocolate flavour to ground toasted cereal, in an amount up to 5% by weight of the desired formulation.

Typically, the cereal is barley; and if so, typically the barley is two-row barley. The reason for that is that two-row barley has higher protein—to the extent of about 14% to 20% by weight—and about 5% to 6% by weight less carbohydrate, and about 3% to 4% less fibre, than six-row barley.

Further discussion of the nutritional value and expectations of the malt-infused chocolate formulations of the present invention, follows hereafter.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

It will be evident from discussion from above that the teachings of the prior art patents U.S. Pat. Nos. 4,119,740 and 4,335,153 in particular, are predicated on price considerations. The inventions described therein were driven as a consequence of price pressures at the time that the inventions were made; and although one of the patents—the '740 patent—provides cocoa extenders as opposed to imitation cocoa, the other patent—the '153 patent—teaches imitation cocoa.

The present invention, on the other hand, provides that all of the ingredients of the malt-infused chocolate formulations are natural, and in that regard the formulations taught herein avoid incorporation of ingredients which are known allergens. Further, no artificial flavours or colours are employed.

Thus, the invention contemplates that the use of malted cereals practice of the present invention will be undertaken by persons having appropriate knowledge of the chocolate industry and its requirements for colour and flavour contribution of the chocolate formulation ingredients. Thus, the use of a malted cereal in keeping with the present invention requires that the malted cereal will be toasted to a desired degree of colour and flavour.

The present invention provides, that the malt-infused chocolate formulations may employ either cocoa liquor or cocoa butter as a principle flavour ingredient, and that the other colour and flavour ingredient will be a non-fat, cereal-based cocoa extender. Thus, the only fat contribution to the chocolate formulations of the present invention comes from the cocoa liquor or cocoa butter; the use of cocoa liquor provides that there will be a certain contribution of cocoa powder as well; the use of cocoa butter per se, provides that the principle chocolate flavour contribution will come from the cocoa butter.

However, as noted, the present invention also provides that an additional natural chocolate flavour additive may be employed, if necessary and appropriate.

In the manufacture of malt-infused chocolate formulations in keeping with the present invention, the following steps are taken:

(a) First, the chosen malted cereal is toasted to a desired degree of colour and flavour. The method of toasting, and the temperature at which the toasting is carried out, are dependent on the nature of the cereal, the moisture content thereof, and so on, but they are beyond the scope of the present invention.

(b) In any event, after the cereal has been toasted, it is finely ground. Typically, the grinding is such that the particle side is reduced to about 12 μm, or in other words so that at least 99% will pass through a 200 mesh sieve.

(c) The finely ground toasted cereal is then cooled to a temperature below 30° C. Typically, that temperature is about room temperature, e.g. 20° C. to 23° C.

(d) Finally, the desired amount of cocoa liquor or cocoa butter is added to the ground toasted cereal, and thoroughly mixed with it. The mixing is typically carried out in a ribbon blender with constant agitation, operating at about 6 to 10 RPM.

It has been noted that the desired amount of cocoa liquor or cocoa butter is added to the ground toasted cereal. The desired amount is typically in keeping with conventional cocoa nomenclature, whereby high fat, medium fat, or low fat cocoas are provided.

The high fat cocoa is referred to in conventional nomenclature as breakfast cocoa, and contains a cocoa butter content of typically 22% to 24%, the remaining 76% to 78% being non-fat cocoa.

So as to obtain the same fat content, the present invention provides for a formulation which includes 40% to 46% of cocoa liquor, with the remaining 54% to 60% of the formulation comprising the non-fat cocoa extender of the present invention.

That formulation provides cocoa butter in the range of about 22% to 24%.

Of course, if cocoa butter per se is used, then an adjustment is made so that the amount of non-fat cocoa extender in keeping with the present invention will be in the range of 76% to 78%.

Likewise, medium fat cocoa formulations can be prepared using 26% to 34% cocoa liquor, and 66% to 74% non-fat cocoa extender. Alternatively, the more conventional 14% to 18% of cocoa butter constituent can be employed, with 82% to 86% non-fat cocoa extender in keeping with the present invention.

Likewise, low fat cocoa formulations can be provided in keeping with the present invention, employing 19% to 23% cocoa liquor together with 77% to 81% non-fat cocoa extender; or employing 10% to 12% cocoa butter with 88% to 90% of non-fat cocoa extender in keeping -with the present invention.

As to the nutritional compositions of chocolate formulations in keeping with the present invention, the following examples provide typical data. It should be noted that the following examples are based on the employment of toasted malted barley in keeping with the provisions of the present invention, although other typical nutritional constituents are also noted in the following table, in which a comparison with the defatted cocoa is made.

TABLE I

|  | Cocoa Defatted | Toasted Barley | Toasted Wheat Bran | Toasted Defatted Wheat Germ |
| --- | --- | --- | --- | --- |
| Carbohydrate | 54 | 70 | 20 | 38 |
| Fibre | 7 | 12 | 48 | 20 |
| Protein | 29 | 11 | 17 | 31 |
| Minerals | 5 | 3 | 7 | 6 |
| Moisture | 5 | 3 | 7 | 6 |
| Fat | negligible | 1 | 4 | negligible |

Thus, based on the above, the following comparisons can be made with respect to natural cocoa in keeping with a couple of conventional nomenclatures, compared with similar malt-infused chocolate formulations in keeping with the present invention, having identical fat content.

TABLE II

|  | Natural Low Fat Cocoa | Low Fat Malt-Infused Chocolate Formulations |
|---|---|---|
| Carbohydrate | 47 | 58 |
| Fibre | 6 | 11 |
| Protein | 26 | 13 |
| Minerals | 5 | 3 |
| Moisture | 5 | 4 |
| Fat | 11 | 11 |
|  | 100 | 100 |

TABLE III

|  | Breakfast Cocoa | High Fat Malt-Infused Chocolate Formulations |
|---|---|---|
| Carbohydrate | 14 | 49 |
| Fibre | 32 | 8 |
| Protein | 20 | 12 |
| Minerals | 5 | 22 |
| Moisture | 5 | 4.5 |
| Fat | 24 | 24 |
|  | 100 | 100 |

It will be understood from all of the above discussion that the cocoa butter, whether as cocoa butter per se or as a cocoa butter constituent of cocoa liquor, is the fat system in which the non-fat, cereal-based extender is suspended. The employment of the cocoa extenders in keeping with the present invention provides identical texture and flavour, organoleptic properties, and the like, as natural cocoa; and it has been determined that malt-infused chocolate formulations in keeping with the present invention have essentially the same solubility as cocoa powder in milk. However, because the malt-infused chocolate formulations of the present invention have a higher carbohydrate content than that of natural cocoa, there will be a further absorption of water as a consequence thereof.

The degree to which the malted cereal is toasted, as discussed above, determines the colour and flavour contribution that will be provided by the toasted malted cereal, and it will be readily understood that it can be adjusted so as to suit the requirements for dark chocolate, milk chocolate, or lighter chocolate.

The caloric values of malt-infused chocolate formulations and conventional cocoa formulations are essentially the same, although the carbohydrate and protein ratios may vary, from natural cocoa with respect to malt-infused chocolate formulations in keeping with the present invention.

A particular advantage of the present invention is that the price of the cereal-based cocoa extenders in keeping with the present invention, compared with the price of cocoa powder, may be such that an eight-fold up to a twelve-fold advantage may be enjoyed as a consequence of the employment of the non-fat, cereal-based cocoa extenders in keeping with the present invention, over the price of natural cocoa.

There have been described malt-infused chocolate formulations in keeping with the present invention, which can be prepared by the employment of cocoa liquor or cocoa butter, together with the inclusion of a lesser or greater amount of non-fat, cereal-based cocoa extenders which are derived from finely ground toasted malted cereals.

Variations of, and alterations to the formulations in keeping with the present invention will be evident to those skilled in the art, without parting with the spirit and scope of the appended claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A malt-infused chocolate formulation comprising from 19% to 50% by weight of cocoa liquor and from 81% to 50% by weight of a non-fat, cereal-based cocoa extender; wherein said non-fat, cereal-based cocoa extender consists of finely ground toasted malted cereal chosen from the group consisting of barley, wheat, rye, buckwheat, oats, rice, and mixtures thereof.

2. The malt-infused chocolate formulation of claim 1, wherein the ranges of said formulation are in keeping with conventional cocoa nomenclature as follows:

| Breakfast Cocoa | 40% to 46% cocoa liquor |
|---|---|
|  | 60% to 54% non-fat cocoa extender |
| Medium Fat Cocoa | 26% to 34% cocoa liquor |
|  | 74% to 66% non-fat cocoa extender |
| Low Fat Cocoa | 19% to 23% cocoa liquor |
|  | 31% to 77% non-fat cocoa extender |

3. The malt-infused chocolate formulation of claim 1, wherein said finely ground non-fat, cereal-based cocoa extender has been ground to a fineness such that at least 99% passes through a 200 mesh sieve.

4. The malt-infused chocolate formulation of claim 1, wherein said finely ground non-fat, cereal-based cocoa extender is based on malted barley.

5. The malt-infused chocolate formulation of claim 4, wherein said barley is two-row barley.

6. The malt-infused chocolate formulation of claim 1, further comprising up to an additional 50% by weight of natural chocolate flavour additive.

7. A malt-infused chocolate formulation comprising from 10% to 27% by weight of cocoa butter and from 90% to 73% by weight of a non-fat cereal-based cocoa extender; wherein said non-fat, cereal-based cocoa extender consists of finely ground toasted malted cereal chosen from the group consisting of barley, wheat, rye, buckwheat, oats, rice, and mixtures thereof.

8. The malt-infused chocolate formulation of claim 7, wherein the ranges of said formulation are in keeping with conventional cocoa nomenclature, as follows:

| Breakfast Cocoa | 22% to 24% cocoa butter |
|---|---|
|  | 78% to 76% non-fat cocoa extender |
| Medium Fat Cocoa | 14% to 18% cocoa butter |
|  | 86% to 82% non-fat cocoa extender |
| Low Fat Cocoa | 10% to 12% cocoa butter |
|  | 90% to 88% non-fat cocoa extender |

9. The malt-infused chocolate formulation of claim 7, wherein said finely ground non-fat, cereal-based cocoa extender has been ground to a fineness such that at least 99% passes through a 200 mesh sieve.

10. The malt-infused chocolate formulation of claim 7, wherein said finely ground non-fat, cereal-based cocoa extender is based on malted barley.

11. The malt-infused chocolate formulation of claim 10, wherein said barley is two-row barley.

12. The malt-infused chocolate formulation of claim 7, further comprising up to an additional 50% by weight of natural chocolate flavour additive.

13. A method of making a malt-infused chocolate formulation comprising from 19% to 50% by weight of cocoa liquor and from 81% to 50% by weight of a-non-fat, cereal-based cocoa extender;

wherein said non-fat, cereal-based cocoa extender consists of finely ground toasted malted cereal chosen from the group consisting of barley, wheat, rye, buckwheat, oats, rice, and mixtures thereof;

wherein said method comprises the steps of:
(a) toasting malted cereal to a desired degree of colour and flavour;
(b) grinding the toasted cereal of step (a);
(c) cooling the ground toasted cereal to below 30° C.; and
(d) adding the desired amount of cocoa liquor to said ground toasted cereal and thoroughly mixing the same.

14. The method of claim 13, wherein step (b) is carried out so that at least 99% of the ground toasted cereal will pass through a 200 mesh sieve.

15. The method of claim 13, further comprising the step:
(e) after step (c), adding an additional natural chocolate flavour to said ground toasted cereal, in an amount up to 5% by weight of the desired formulation.

16. A method of making a malt-infused chocolate formulation comprising from 10% to 27% by weight of cocoa butter and from 90% to 73% by weight of a non-fat, cereal-based cocoa extender;

wherein said non-fat, cereal-based cocoa extender consists of finely ground toasted malted cereal chosen from the group consisting of barley, wheat, rye, buckwheat, rice, oats, and mixtures thereof;

wherein said method comprises the steps of:
(a) toasting malted cereal to a desired degree of colour and flavour;
(b) grinding the toasted cereal of step (a);
(c) cooling the ground toasted cereal to below 30° C.; and
(d) adding the desired amount of cocoa butter to said ground toasted cereal and thoroughly mixing the same.

17. The method of claim 16, wherein step (b) is carried out so that at least 99% of the ground toasted cereal will pass through a 200 mesh sieve.

18. The method of claim 16, further comprising the step:
(e) after step (c), adding an additional natural chocolate flavour to said ground toasted cereal, in an amount up to 5% by weight of the desired formulation.

* * * * *